US008926738B2

(12) United States Patent
Lupica et al.

(10) Patent No.: US 8,926,738 B2
(45) Date of Patent: Jan. 6, 2015

(54) BRAKE PAD ASSEMBLY AND METHOD FOR COLLECTING BRAKE PARTICLES

(75) Inventors: Fabrizio Lupica, Turin (IT); Domenico Gucciardi, Turin (IT)

(73) Assignee: Idlos B.V., Amsterdam (NL)

(*) Notice: Subject to any disclaimer, the term of this patent is extended or adjusted under 35 U.S.C. 154(b) by 80 days.

(21) Appl. No.: 13/236,850

(22) Filed: Sep. 20, 2011

(65) Prior Publication Data
US 2012/0067206 A1 Mar. 22, 2012

Related U.S. Application Data

(60) Provisional application No. 61/384,332, filed on Sep. 20, 2010.

(51) Int. Cl.
*F16D 65/00* (2006.01)
*B03C 1/30* (2006.01)
*B03C 1/32* (2006.01)
*B03C 1/033* (2006.01)

(52) U.S. Cl.
CPC ............ *B03C 1/0332* (2013.01); *B03C 2201/20* (2013.01); *B03C 1/30* (2013.01); *B03C 1/32* (2013.01); *F16D 65/0031* (2013.01)
USPC ............... 96/1; 55/385.3; 55/428; 188/218 A; 188/218 XL

(58) Field of Classification Search
USPC ............. 55/385.3, 385.2, 515, 385.1; 96/147, 96/152, 418, 1, 15; 454/69, 83, 156; 123/198 E; 280/847, 848, 851; 95/28, 95/57; 188/218 A, 218 XL
See application file for complete search history.

(56) References Cited

U.S. PATENT DOCUMENTS

| 3,697,910 | A | * | 10/1972 | Tschabrun et al. | ........... 335/296 |
|---|---|---|---|---|---|
| 3,998,301 | A | * | 12/1976 | Morse et al. | ............... 188/251 A |
| 5,162,053 | A | * | 11/1992 | Kowalski, Jr. | ............... 55/385.3 |
| 6,592,642 | B2 | * | 7/2003 | Maricq et al. | ................ 55/385.3 |
| 7,094,268 | B2 | * | 8/2006 | Krantz | ........................ 55/385.3 |
| 7,833,302 | B2 | * | 11/2010 | Krantz | ........................ 55/385.3 |
| 8,211,216 | B2 | * | 7/2012 | Castronovo | ..................... 95/280 |
| 2002/0185346 | A1 | * | 12/2002 | Hays, Jr. | ................... 188/251 A |
| 2007/0000740 | A1 | | 1/2007 | Raab | |

FOREIGN PATENT DOCUMENTS

| DE | 4240873 A1 | 6/1994 |
|---|---|---|
| DE | 4401846 A1 | 7/1995 |
| DE | 19846887 A1 | 4/2000 |
| DE | 202005009278 U1 | 5/2006 |

(Continued)

OTHER PUBLICATIONS

Machine Translation into English of the Japanese Document JP 2002-317841 A which was published on Oct. 31, 2002.*

(Continued)

*Primary Examiner* — Duane Smith
*Assistant Examiner* — Minh-Chau Pham
(74) *Attorney, Agent, or Firm* — Lowe Hauptman & Ham, LLP

(57) ABSTRACT

A disk brake pad (11) comprising a supporting base (13) with which a layer (15) of friction material is associated, characterized in that a wall (19) of said supporting base having associated therewith the layer of friction material is passed through by at least one channel (21, 23, 41) communicating with a chamber (17a, b), defined in correspondence of the supporting base, for collecting the powders produced due to the wear of the friction material.

26 Claims, 11 Drawing Sheets

(56) References Cited

FOREIGN PATENT DOCUMENTS

| DE | 102005006465 | A1 | | 8/2006 | |
| DE | 102006051972 | A1 | | 5/2008 | |
| EP | 1256739 | A2 | | 11/2002 | |
| EP | 2151596 | A1 | | 2/2010 | |
| JP | 11311272 | A | | 11/1999 | |
| JP | 2002-317841 | A | * | 10/2002 | 55/385.3 |
| WO | 81/02690 | A1 | | 3/1981 | |

OTHER PUBLICATIONS

English Abstract of DE 4240873.
English Abstract of DE 102005006465.
English Abstract of JP 11311272.
International Search Report issued in corresponding International Application No. PCT/NL2010/050607, mailed Nov. 16, 2010.

* cited by examiner

US 8,926,738 B2

BRAKE PAD ASSEMBLY AND METHOD FOR COLLECTING BRAKE PARTICLES

RELATED APPLICATION DATA

This application claims priority to U.S. Provisional Patent Application No. 61/384,332, filed on Sep. 20, 2010 and is hereby incorporated herein by reference in its entirety for all purposes.

TECHNICAL FIELD

The present invention relates to a disk brake pad.

More precisely, the invention relates to a disk brake pad or assembly of the kind equipped with means for collecting the powders produced due to the wear of the friction material, aiming therefore at reducing the primary pollution caused by the dispersion of such powders into the environment.

PRIOR ART

Disk brake pads are commonly used in vehicles of any kind, in particular motor vehicles, such as motor cars, motorcycles, railroad vehicles and so on.

As known, brake pads comprise a supporting base to which a layer of friction material adheres. The layer of friction material generates a friction on the brake disk when the material is pressed against the disk due to a push, generally obtained by hydraulic pistons, against the supporting base. In the past, the friction material mainly consisted of a mixture of several materials where asbestos was prevailing. At present however use of such material is prohibited and this kind of mixture is nowadays mostly replaced by mixtures mainly comprising binding resins, metals, abrasives and lubricants.

Analyses carried out on the powders produced due to the wear of the currently used friction material reveal the presence of metal substances, such as zinc, copper, barium, aluminum, magnesium, iron, calcium, potassium, sulphur, silicon and sodium, many of which, as known, are noxious to living beings.

The problem of how to reduce dispersion into the environment of powders produced due to the wear of the friction material of the brake pads is a highly topical subject and is of paramount importance for human health.

Analyses carried out on said powders reveal the presence of several metals and substances which are noxious especially in case of inhalation.

Therefore several solutions have been developed in the past in an attempt to remedy the above problem.

A first group of solutions, such as for instance the ones disclosed in EP1256739, DE102005006465 and WO8102690, exploit the phenomenon of the magnetic attraction of metal particles in order to avoid powder dispersion into the environment.

More complex solutions, such as for instance the one disclosed in DE4240873, associate the brake assembly with an independent sucking unit equipped with ducts and a collecting reservoir.

Other solutions, such as for instance the one disclosed in US2007/0000740, associate the brake assembly with a collecting device that mechanically captures the powder produced due to the wear of the pads.

In other cases, solutions have been adopted according to which the brake pad itself is equipped with powder capturing means. An example of a brake pad of the above kind is disclosed in JP11311272.

The solution disclosed in the latter document is however unsuitable, since it provides for collecting the powder through a bead of a material arranged around the friction material, which bead consequently wears during use of the pad and moreover is not capable of retaining the great amount of powder produced upon a prolonged use.

The other prior art solutions have not proved practically feasible and sufficiently effective in order to avoid powder dispersion, and moreover they proved to be expensive and complex to manufacture so that, in the absence of a rule compelling to install them, they have not been commercially successful. Moreover, such solutions generally have the drawback that they do not allow removal of the collected powder, or they make such removal difficult, in particular before the brake pad needs to be replaced, with the result that the collecting effect of the prior art devices is often made fruitless after a low mileage, for example due to the non-removal of the accumulated powder.

It is a main object of the present invention to provide an alternative or improved solution to the problem of how to avoid dispersion of the powders produced due to the wear of the friction material of the disk brake pads, with the main purpose of reducing the primary pollution caused by the dispersion of such powders into the environment.

It is another object of the present invention to provide a solution to the above problem of pollution of the environment by brake powder, which solution moreover allows effectively collecting the powders produced due to the wear of the friction material in order to allow the disposal and possibly the recycling of the same powders, for instance for manufacturing new brake pads.

It is a further, but not the last object of the invention to provide a brake pad that can be industrialized with limited costs and that therefore is suitable for large scale manufacturing at reasonable cost, for example with costs that are comparable to or at most little higher than the costs of conventional brake pads.

DESCRIPTION OF THE INVENTION

At least one of the above and other objects is achieved through a disk brake pad as claimed in the appended claims or disclosed in this description.

A brake pad according to the invention in an embodiment can mainly differ from conventional pads in that it has a hollow supporting base provided with at least one channel communicating with the surface of the supporting base with which the layer of friction material is associated, said channel being also arranged to pass through the friction material when the channel is provided in correspondence of the portion of said surface covered by said layer.

A further advantage of the invention is the provision of a second collecting chamber communicating with the first chamber in the supporting base and removable for the removal of the material accumulated therein. In this description chamber has to be understood as including but not limited to an open or boxed in space and/or channels extending through the base of a brake pad and/or through the brake pad, such as but not limited to the friction material attached to the base.

Thanks to such a second chamber, a solution is provided that allows effectively collecting the powders produced due to the wear of the friction material in order to allow the disposal and possibly the recycling of the same powders, for instance for manufacturing new brake pads.

Advantageously, the collecting device according to the invention allows further reducing dispersion of the powders produced due to the wear of the pad through a mechanical action. Moreover, thanks to a removable internal lining of the collecting device, powder collection advantageously takes place effectively and by using means with limited cost. Such liner can be provided in at least one chamber or several chambers, if available.

A further, but not the last advantage of the invention is the provision of magnetic field inside at least one chamber, or in both or all chambers when multiple chambers are provided, which fields are capable of exerting a magnetic attracting force on the particles of material produced due to the wear of the friction layer and the brake disk.

The brake pad according to the invention can be advantageously manufactured with limited modifications to the structure of the conventional pads.

A further advantage of the invention is moreover the possibility of housing the brake pad according to the invention within the existing brake assemblies, without need to modify them.

In an aspect a brake pad can be defined by a supporting base with which a layer of friction material is associated. A wall of said supporting base having associated therewith the layer of friction material is passed through by at least one channel communicating with a chamber, defined in correspondence of the supporting base, for collecting the powders produced due to the wear of the friction material.

In another aspect a disk brake assembly of this disclosure can comprise at least one caliper arranged to house at least one brake pad. The at least one brake pad can be a brake pad as claimed in any one of the claims.

In another aspect a brake assembly, which can be as defined here above, can have associated therewith a collecting device comprising a first body, preferably arc-shaped, with a box structure. A hollow intended to receive a complementary member made of a material capable of retaining the powders can be provided within at least part of the collecting device.

In an other aspect a method of this disclosure can comprise collecting powders generated by or coming from a brake pad of a vehicle brake system, comprising the step of providing at least one chamber associated with a brake pad, wherein a magnetic field is generated in or for said chamber, attracting powder resulting from friction on the brake pad and collecting said powder inside said at least one chamber.

Preferably at least one liner is used in or for said at least one chamber, for retaining powder inside said chamber.

BRIEF DESCRIPTION OF THE FIGURES

A description of embodiments of the invention, given only by way of non limiting examples, will be provided hereinafter with reference to the accompanying Figures, in which.

DESCRIPTION OF PREFERRED EMBODIMENT

Figure 1:
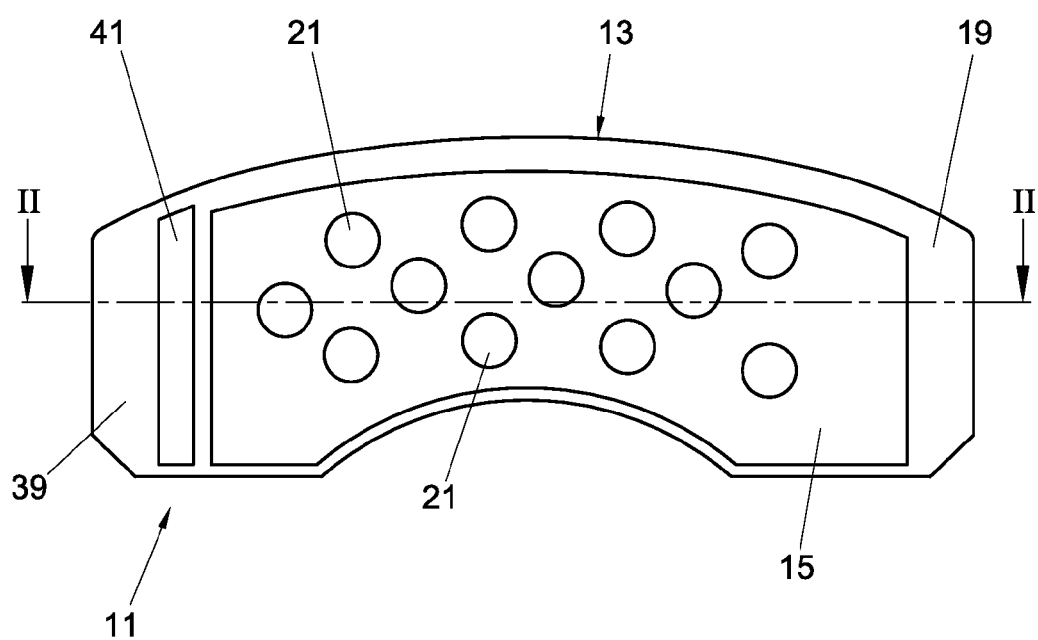
FIG. 1 is a front view of the brake pad according to the invention.

In this description the same or similar elements in different embodiments will be indicated with the same or similar reference signs. The figures are schematically only and should not be construed as limiting the scope of protection as defined by the claims and the full disclosure. All parts and elements of the disclosed embodiments are considered to have been disclosed in combination as well as individually. Any combination of parts and/or elements of the disclosed embodiments are also considered to have been disclosed in all possible other combinations and permutations.

In this description brake pad has to be understood as meaning at least but not limited to a combination of elements comprising a base and at least one pad of friction material attached thereto or an integral part thereof. In known brake systems using brake pads commonly at least two such brake pads are used for each wheel, at least one to each side of a brake disc to which the respective wheel is attached. In some of the following drawings only one of such brake pads is disclosed, by way of example. Similar or identical brake pads can be used on one or on both of said opposite sides of the brake disc.

In this description references a side view or top view of a pad or arrangement will be with reference to a position as defined by a vehicle in a normal driving position, unless otherwise defined. For discussion of the individual parts such as but not limited to the caliper of a braking system and the arrangement as such top is to be understood, unless otherwise specified, as meaning a side of the caliper facing radially outward with respect to a center of a brake disc with respect to which it is mounted, i.e. with respect to the center axis of rotation of a wheel normally mounted to or associated with said brake disc. Normal direction of rotation of a brake disc is to be understood as a direction of rotation which will occur when the vehicle moves in a forward direction, straight or in a curve or at least a direction of movement in which the vehicle is or will be predominantly move when supported by at least said wheel. Engine side of a brake system has to be understood as meaning a side facing inward with respect to the vehicle, i.e. towards a center of the vehicle, wheel side is to be understood as the opposite, outward facing side, i.e. the side to which the wheel is associated.

In this description powder or similar indications has to be understood as at least encompassing powder, such as but not limited to particles resulting from brake action of a brake arrangement, falling for example in Particle Matter (PM) classes PM10, PM5 and/or PM2.5, materials including but not limited to the materials as disclosed in the introduction to the specification, for example but not limited to particles or materials including particles at least partly attracted by magnetic fields. Definitions and descriptions, as well as norms for Europe of Particle Matter (PM) can be found for example in the European Directive Air 2008/50/EG.

Figure 2:
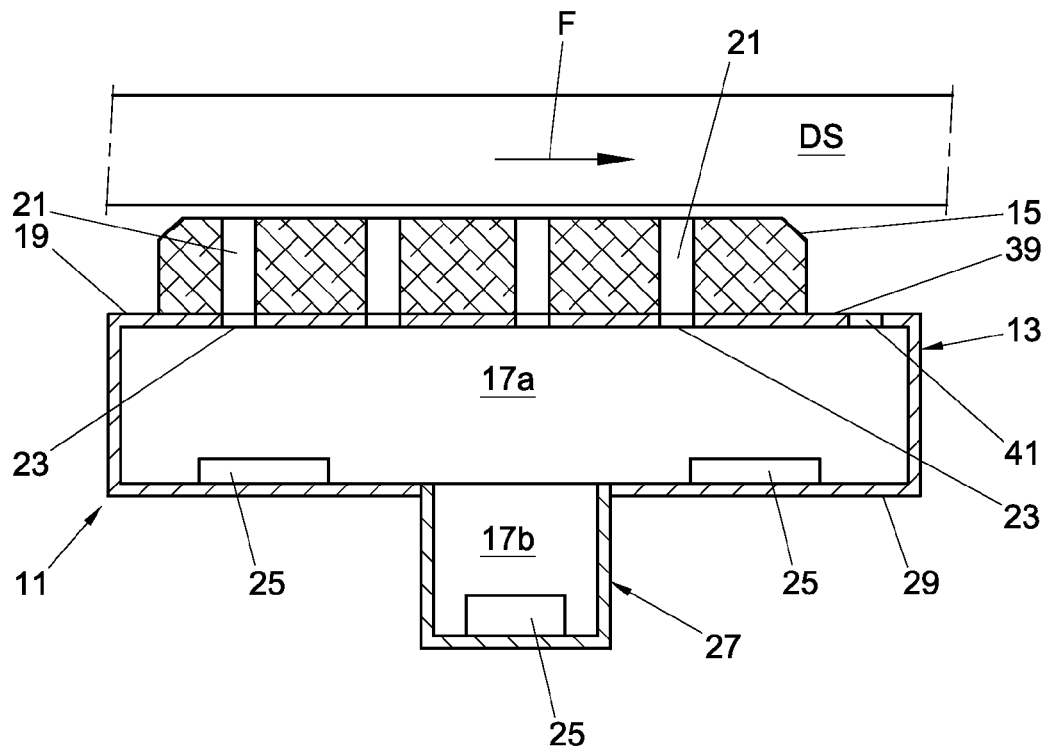
FIG. 2 is a schematic cross-sectional view taken along line II-II in FIG. 1.
Figure 3:
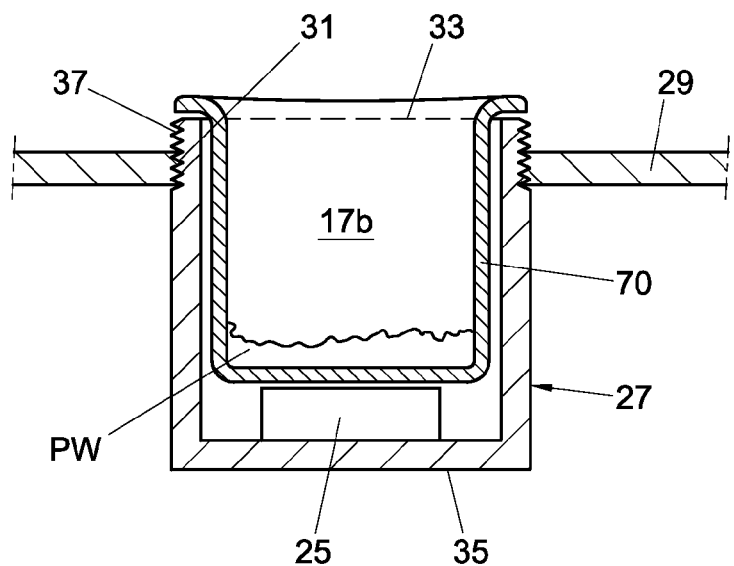
FIG. 3 is an enlarged view of a detail of FIG. 2.

With reference to FIGS. 1 to 3, the brake pad according to the invention, which has been generally denoted by reference numeral 11, comprises a supporting base 13, made for instance of metal, in or at which a first collecting chamber 17a can be defined. Moreover, base 13 has associated therewith, in conventional manner, an external layer 15 of friction material intended to slow the rotation of disk DS, of which the prevailing rotation direction is shown by arrow "F". According to a preferred embodiment of the invention, layer 15 of friction material, adhering to wall 19 of supporting base 13, is passed through by at least one channel 21 communicating with the first collecting chamber 17a through a corresponding channel 23 formed in wall 19 of supporting base 13.

Said channels 21 and/or 23 can be either perpendicular to the surface of supporting base 13 or inclined, and/or can include one or more bends or be straight. The channels 21 and/or 23 can extends partly or entirely along the surface of the supporting base 13.

Preferably, according to the invention, layer 15 of friction material and, correspondingly, wall 19, include a plurality, for instance between 2 and 100, for example between 10 and 50 such channels, such as but not limited to about a dozen, of said channels 21 and 23, regularly or irregularly distributed over the surface of layer 15.

Always in accordance with the invention, at least one device 25 capable of generating a magnetic field can be arranged inside or for the first chamber 17a. In the latter case such device 25 can be provided outside the chamber 17a and/or in a wall of said chamber 17a. Multiple devices 25 for generating a magnetic field can be provided for and/or inside the relevant chamber 17a.

Moreover, always in accordance with the invention, a brake pad 11 or arrangement, especially but not limited to a supporting base 13, can optionally include a collecting reservoir 27, which is preferably removable. In the collecting reservoir 27 a corresponding second collecting chamber 17b can be defined.

In at least one of the first and second chamber 17a, 17b a liner 70 can be provided, which liner can be made of a material that can capture at least part of the powder generated by or released form the friction material 15 during friction between the material 15 and a brake disc DS. The liner can for example be made partially or entirely of a disposable material, such as but not limited to cellulose based material, recyclable material, biodegradable material and/or cleanable material. The liner 70 can preferably be removed from the or each relevant chamber 17a, 17b together with powder PW attached thereto, and can be replaced by a new or at least rejuvenated or emptied and/or cleaned liner 70. In FIG. 3 such liner 70 is shown for the second chamber 17b. Similarly a liner can be provided in the first chamber 17a, whereas a combined liner 70 can be provided for both chambers 17a, b. In another or the same embodiment the at least one chamber 17a, 17b can be emptied in another way, and for example regularly or at least once prior to replacing the brake pad 11 as such, for example when its legal or technical life span is reached or surpassed.

In the example illustrated in FIGS. 1-3, collecting reservoir 27 is associated with wall 29 of supporting base 13, opposed and substantially parallel to wall 19, in correspondence of a threaded bore 31. According to such an arrangement, reservoir 27 therefore has a substantially cylindrical shape with an open first base 33 and a closed opposite base 35, and it is externally threaded at least in correspondence of its edge 37 surrounding open base 33. Preferably, reservoir 27 houses, inside the second chamber 17b, for instance on the bottom in correspondence of closed base 35, at least one device 25 capable of generating a magnetic field. Always in accordance with the invention, at least one such device 25 capable of generating a magnetic field can be arranged inside or for the second chamber 17b. In the latter case such device 25 can be provided outside the chamber 17b and/or in a wall of said chamber 17b. Multiple devices 25 for generating a magnetic field can be provided for and/or inside the relevant chamber 17b.

Such devices 25 can be for instance permanent magnets or electro-magnets and, in the latter case, they are powered for instance by the electric circuit of the vehicle on which the brake pad is mounted. One such device can for example be suitable for use at relatively high temperatures, for example up to or above about 100 degrees Celsius, and could have for example a grade 35, which can be understood as a magnet having a maximum energy product of 35 MGOe (35 Mega Gauss Oersted), which is only disclosed herein by way of example and should by no means be understood as limiting the scope in any way.

If such devices 25 and a liner 70 are provided in at least one of the chambers 17a, 17b, preferably the liner 70 separates, during use, the devices 25 from the powders entering into the relevant chamber 17a, 17b. Thus contact between the powders and the devices 25 can be limited or even prevented.

Preferably, in accordance with the invention, supporting base 13 includes a portion 13 without friction material, and at least one slot or a mesh 41 defining a corresponding channel communicating with collecting chamber 17a is defined in correspondence with such portion.

In embodiments having a second chamber 17b and a first chamber 17a, the first chamber 17a can be formed by an open space between the channels 21, 23, 41 and the second channel 17b. Powder can be forced into at least one of the chambers 17a, 17b through the channels 21, 23, 41 at least partly by powder following said powder entering the channels 21, 23, 41, and/or be pulled into said at least one chamber at least partly be said at least one magnetic field inside at least one of said chambers 17a, 17b. Rotational movement of the disc DS along the friction material 15 and thus passed the channels 21, 23, 41 can also add to the movement of the powder into the channels 21, 23, 41.

In accordance with the invention, pad 11 may include channels 21 and 23 passing through layer 15 and wall 19, respectively, and lack slot 41, or it may lack channels 21, 23 and include said slot 41 on the portion lacking the friction material, or yet it may include both channel 21 passing through the friction material and channel 23 passing through wall 19, and slot 41.

By the provision of channels 21, 23 and/or of slot 41, the powder produced during braking, that is during contact between layer 15 of friction material and disk DS, is directed into collecting chamber 17a. Moreover, since such powders generally are rich in ferrous materials, they are advantageously attracted by the magnetic fields produced by devices 25.

Advantageously, in accordance with the invention, slot 41 is arranged downstream layer 15 of friction material in the prevailing rotation direction of disk DS shown by arrow "F".

When chamber 17a and/or chamber 17b is at least partly full, the powder can be removed and possibly sucked out, for example by removing reservoir 27. However, in a variant embodiment of the invention, the reservoir 27 can be replaced by a plug.

The transversal thickness of brake pad 11, which is the sum of the thicknesses of supporting base 13 and layer 15 of friction material, may be adjusted by taking into account the need to house pad 11 within the existing brake assemblies. Consequently, in order a chamber 17a, b with a sufficiently great collecting volume can be defined, it might be necessary to increase the thickness of supporting base 13 to the expense of the thickness of layer 15 of friction material.

Figure 8:
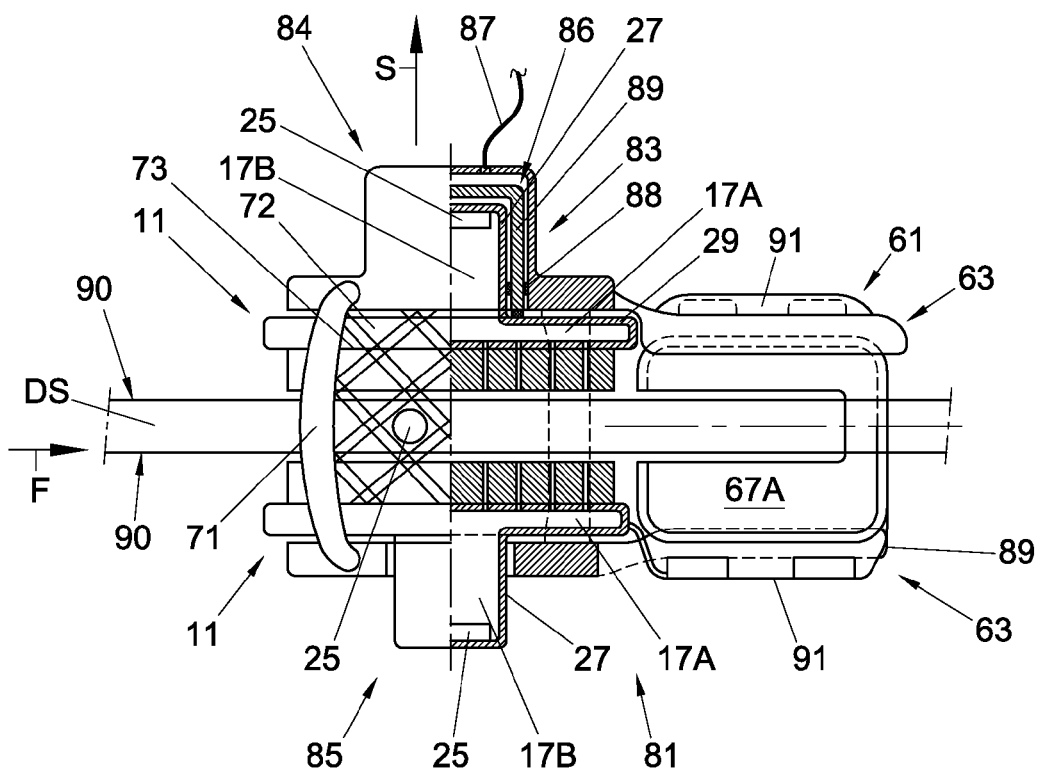
FIG. 8 discloses a brake arrangement seen from a top view, partially in cross section.

Brake systems 81 of the relevant type, comprising at least one brake pad comprise normally a caliper 83 comprising hydraulic cylinders or such actuators to press the or each brake pad 13 against the brake disc DS in order to provide sufficient friction there between for reducing the speed of the vehicle associated i.e. equipped therewith. Calipers 83 usually can have an open top or opening 72 in the top, between bridges 71 connecting both sides of a caliper 83, through which the disc DS can be seen between the brake pads 11 on either side thereof. Through this opening 72 cooling of the disc DS and/or brake pads 11 can be obtained. In embodiments of the invention, for example as shown in FIG. 8, at least one device 25 for generating a magnetic field can be provided in or near said opening 72 for attracting powder from the friction material 15 and/or the disc DS entering said opening 72. The device 25 can be provided on a relatively open structure 73 extending into and/or across and/or over said opening 72, such as a netting, preferably a metal netting or trellis work or other structure allowing air to pass, such that heat dissipation is still possible because the opening 72 is not closed off by said device 25 and/or supporting structure 73. The structure 73 and/or the device 25 can retain the powder until it is removed by a user or the like in environmentally friendly manner, such as for example for environmentally acceptable disposal or reuse of the powder.

Figure 4:
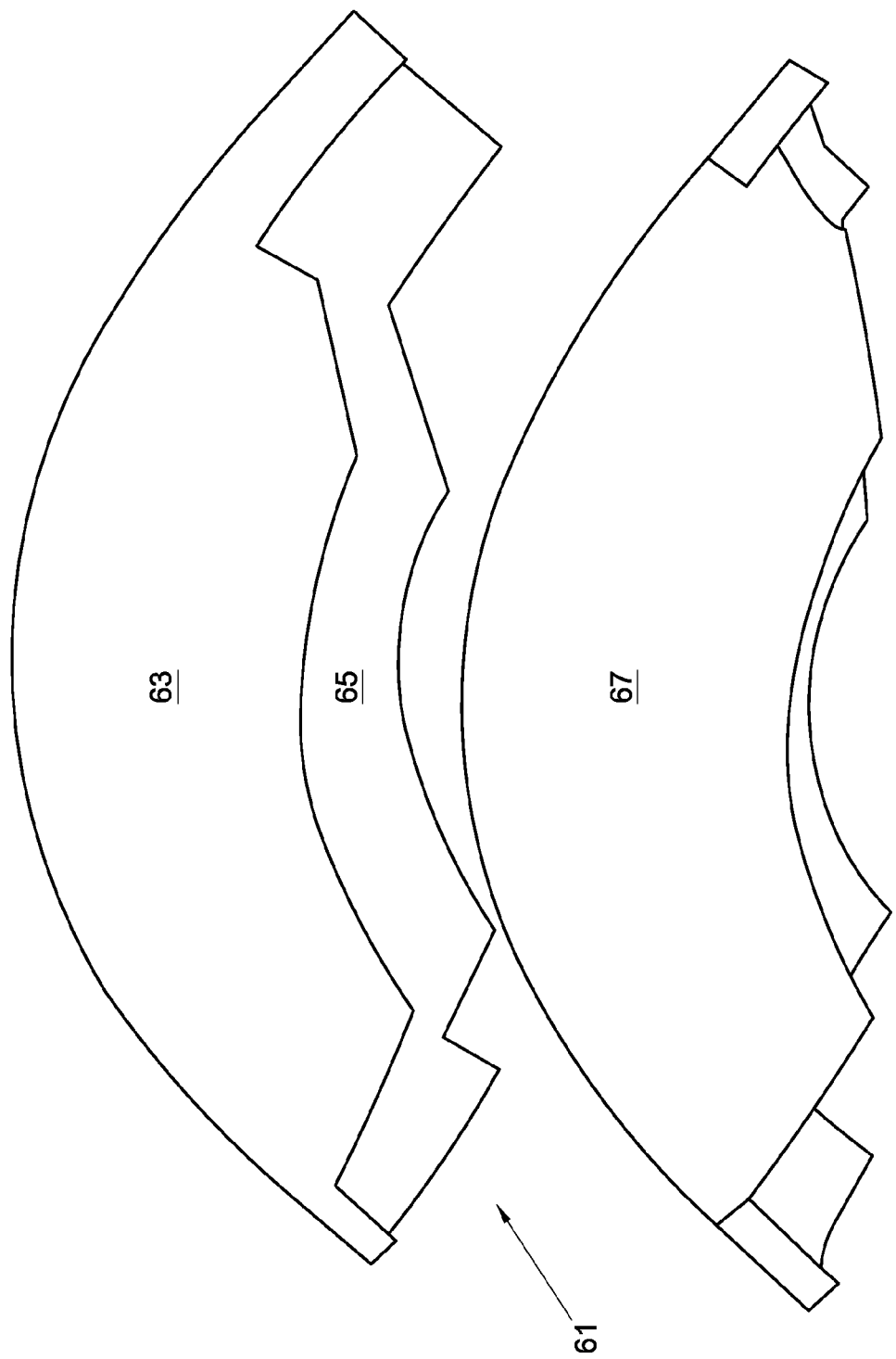
FIG. 4 is an exploded view of the collecting member.
Figure 5:
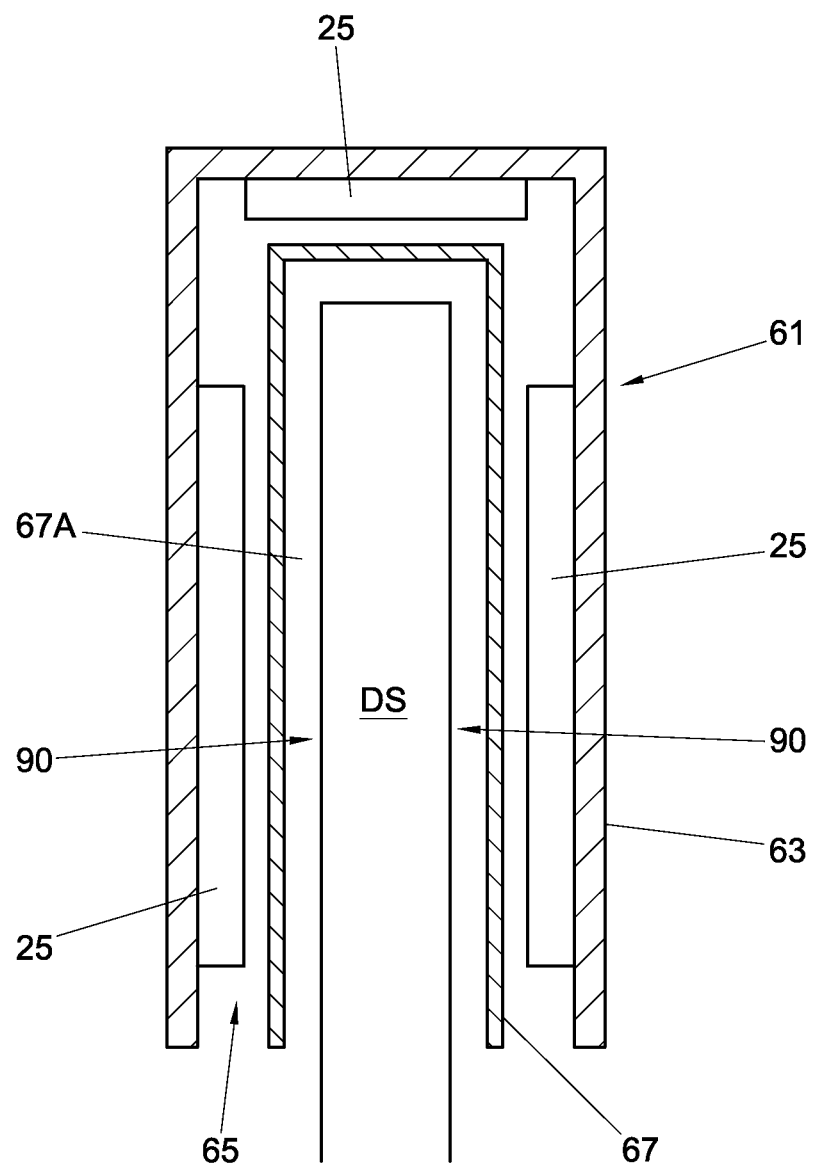
FIG. 5 is a cross-sectional view of the collecting member.

Turning now to FIGS. 4 and 5, there is shown a collecting device, generally denoted by reference numeral 61, which can be optionally associated with the caliper holder where brake pad 11 is mounted, in order to form or increase the capacity of powder retention.

Said collecting device comprises a first, preferably arc-shaped body 63 with a box structure, made for instance of metal or plastics, where a hollow 65 is defined that is intended to receive a complementary member 67 made of a material capable of retaining the powders, in particular fine powders, for instance a cellulose-based material. Moreover, said body 63 can advantageously be made integral with the caliper holder where brake pad 11 is mounted. The complementary member 67 can be a liner similar to and/or made of a similar material as the liners 70 as disclosed in reference to the chambers 17*a* and 17*b*.

A collecting device 61 of FIG. 4 or 5 can be used in combination with an arrangement as disclosed in FIGS. 1-3 or with a known brake arrangement, for example but not limited to arrangements as described in the introduction to the specification.

Always in accordance with the invention, collecting device 61 may internally and/or externally incorporate devices 25 capable of generating a magnetic field, which are preferably located between member 67 and the wall of cavity 65.

In accordance with the invention, member 67 is preferably removable and thus it can be replaced, for example when it is at least partly full or worn. Moreover, said member 67 can be fastened inside cavity 65 by known means, such as Velcro, press studs or adhesive.

Figure 6:
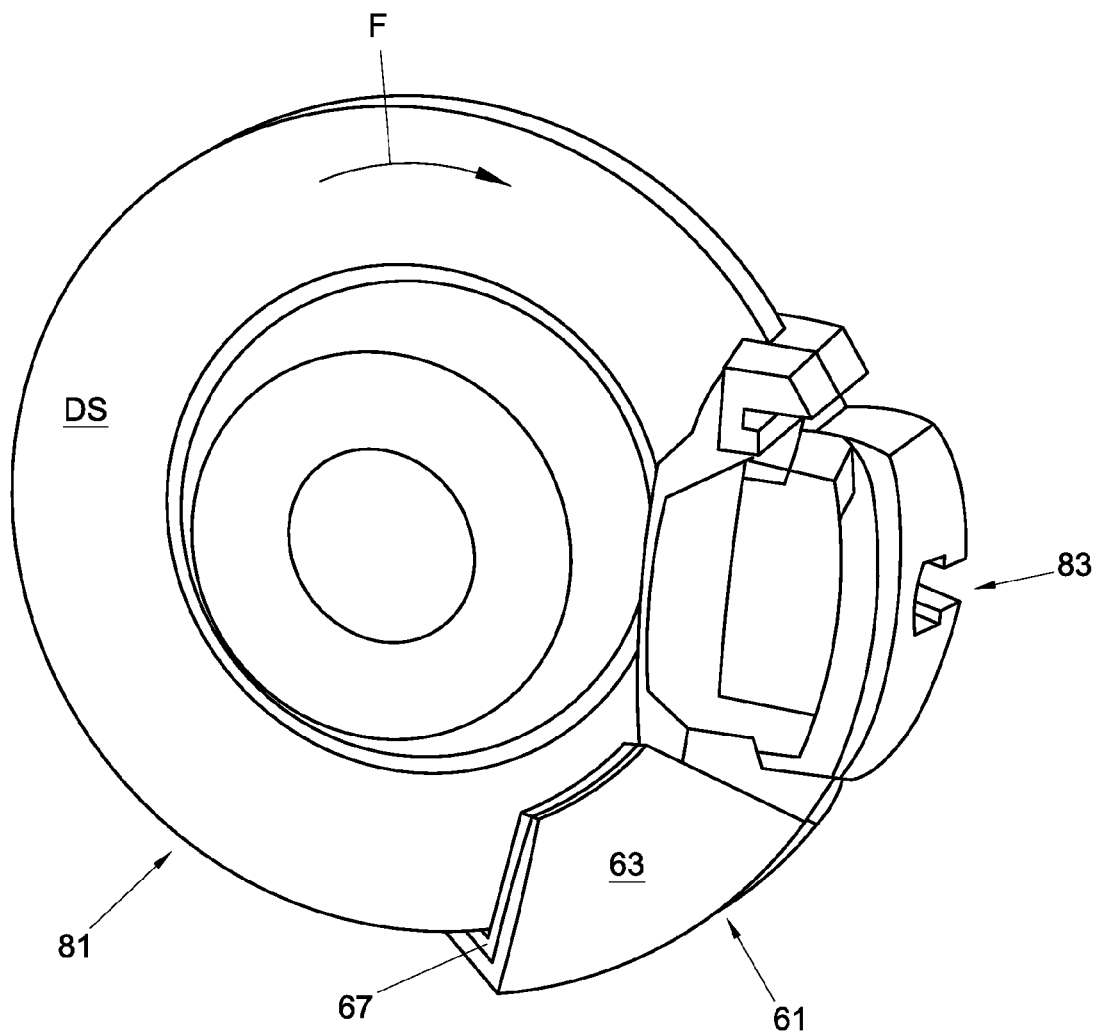
FIG. 6 is an overall view of a disk brake assembly incorporating the invention.

Turning to FIG. 6, there is shown a brake assembly, generally denoted by reference numeral 81, which is equipped with calipers 83 where a pair of pads 11 according to the invention is housed.

Said brake assembly is associated with a brake disk DS and further includes a collecting device 61 located downstream calipers 83 with respect to the preferred rotation direction of disk DS shown by arrow "F".

In embodiments shown the caliper 83 has two sides, each housing at least a brake pad 11, and on at least one side at least one hydraulic cylinder for actuating the brake pads 11. The two sides are connected by spaced apart bridge elements 71, such that the opening 72 is formed, at a top side and at least partly in said sides. At least one second chamber 17*b* or at least part of the relevant reservoir 27 can extend at least partly into said opening 72, preferably to a side of the caliper 83. Thus more optimal use is made of the available space in the brake system.

Figure 7:
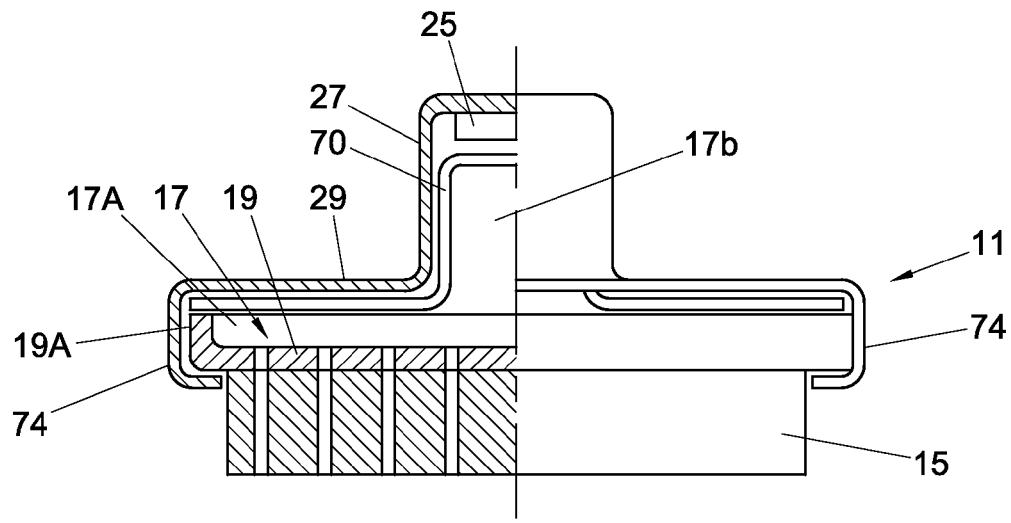
FIG. 7 discloses in partial cross section a brake pad with collecting chambers.

FIG. 7 shows, partly in cross section, a pad 11 in an alternative embodiment. In this embodiment the base 13 has a wall 19 with a rim 19A defining a recessed area 17. A wall 29 comprising a reservoir 27 is provided, which wall 29 closes off the recessed area 17, thus forming a first chamber 17*a*. The reservoir 27 again defines a second chamber 17*b*. The wall 29 is provided with wing elements 74 which are folded over a side of the rim 19A and partly over wall 19 for attaching the wall 29 to the base 13. The reservoir 27 can be integral with the wall 29, and can have any desired shape or dimension. In another embodiment the reservoir can be provided as a separate element, for example as disclosed in FIGS. 1-3. A liner 70 can be provided but can also be formed differently or can be omitted.

FIG. 8 shows in top view a brake system or assembly, in an embodiment comprising both chambers 17*a, b* and collecting device 61. As indicated before, a brake system of the present disclosure could also only comprise one or two of said chambers 17*a, b* and/or said collecting device 61, in any combination, or more chambers. Openings or channels 21, 23, 41 could also extend at least in part or all directly into the collecting device 61.

In the brake system as shown in FIG. 8 the caliper 83 comprises a first side 84, for example the engine side, and an opposite second side 85, for example the wheel side. The caliper 83 will be attached to a vehicle in a known manner, preferably at an engine side. The first and second side 84, 85 are connected by and preferably made integral with bridges 71, in a known manner. The caliper 83 can be a standard type for the respective vehicle. The first side 83 comprises a chamber 86 having for example a cylindrical shape, which can form part of a main or additional brake cylinder system. A hydraulic or brake fluid supply line 87 can extend into said chamber 86, in a known manner. Within said chamber 86 a brake piston 89 is provided, in a known manner. The piston 89 is hollow and for example cylindrical and movably sealed against said chamber 86 by a seal system or arrangement 88, such that the piston can de facto form a piston of the brake piston cylinder arrangement, such that when brake fluid or hydraulic fluid is supplied to said chamber 86, the piston is actuated. The reservoir 27 extends into the hollow piston 89, which piston abuts the wall 29 of the pad 11 and thus upon said actuating of the piston 89 the pad 11 is moved towards the disc DS relative to the caliper side 83, such that the brake is activated and the disc DS is prevented from or at least restrained in possible rotation, thus braking the vehicle. Preferably the reservoir 27 fits spaciously within said hollow reservoir, such that it can be placed and removed relatively easily.

On the opposite second side 85 the reservoir 27 extends through the opening 72 to the relevant side of the caliper 83, and can be part of a so called passive brake pad 11, meaning that when the brake is activated, relative movement of the caliper 83 in side direction S, resulting from said fluid entering said chamber 86, will force the pad 11 at the second side 85 against the disc DS too. Thus optimal braking will be obtained.

In the embodiment of FIG. 8 the device 61 can be provided with two bodies 63, one to each side of the disc DS, connected to the respective sides 84, 85 of the caliper 83, extending substantially alongside part of the disc DS, in the direction F downstream of the caliper 83. Each body 63 can be provided as a bent strip, forming a loop. The body or strip can be made of any suitable material. An attachment means, such as friction material, Velcro, glue or any other suitable means can be provided on the strip, for attaching, preferably releasably, a member 67 to said bodies 63. In the same or other embodiments the member 63 can be press fit or form retained within or on said bodies. In the embodiment shown the member 67 is in top view substantially C-shaped, such that it extends from one side 84 around the peripheral edge of the disc DS to the opposite second side 85. The member is hollow on the inside, i.e. the side facing the disc DS, and has an outer shape such that it fits, preferably snugly, within the loops formed by the bodies 63, to be attached thereto or at least held partly in position by said bodies, especially but not necessarily by the attachment means. The sides of the member 67 facing the disc DS can extend at a short distance from the adjacent surfaces 90 of the disc DS, for example in the order of millimeters or less, such that preferably no contact between the member and the disc will occur, whereas as little as possible of the powder can pass between the member and the disc, at least at the downstream end thereof, facing away from the caliper 83. The member 67 can be made of the same or different material as the liner 70 as discussed before. The member 67 can form one or more chambers 67A, on opposite sides 90 of the disc DS. If there are separate members 67 on said opposite sides, each member will provide at least one such chamber 67A. Covers 91 can be provided on either side 84, 85, over the respective parts of the member 67, especially within the bodies 63. In and/or on the covers 91 devices 25 for generating a magnetic field can be provided, for generating such magnetic field with respect to and preferably in the chamber or chambers 92 formed within member 67 facing and open towards the disc DS. Powder will then be adhered at least partly to said member, at least partly attracted by the magnetic field.

Devices 25 for generating magnetic fields can be chosen dependent on for example their use, the size of the chambers 17a, 17b and/or device 61, the size and type of vehicle, the materials used for the friction material 15 and/or the brake disc DS and other considerations, which will be directly clear to the skilled person.

FIG. 9 shows a brake pad 11 in four different views. FIG. 9A shows the friction material 15 side, clearly showing entrances of channels 21 extending through the friction material 15. At opposite sides bracket elements 92 are provided, forming part of or being attached to the base wall 19 of the pad 11 or at least of or to the base 13. Channels 21 or at least the openings thereof can be of different size and/or shape, or can be identical, and can be regularly or irregularly spaced. The number, sizes and patterns of the channels can be chosen by a skilled person, based on factors defined by the specific application.

Figure 9A:
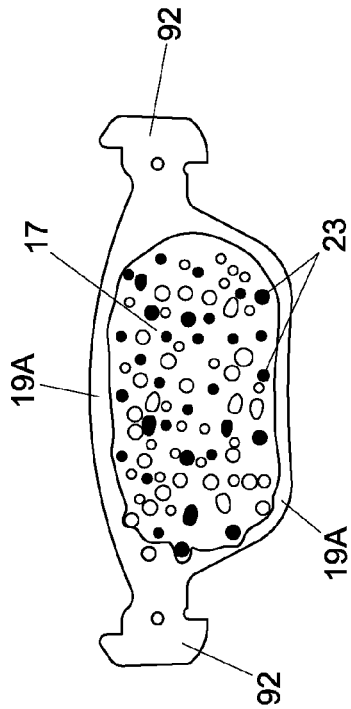
FIG. 9A-B show a brake pad in opposite side views respectively.
Figure 9B:
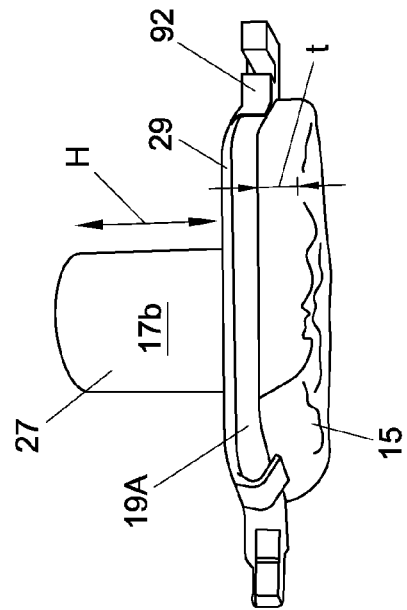

In FIG. 9B the opposite side is shown, which in use extends at a side facing away from the disc DS. This shows the wall 19 with the openings 23 in communication with the channels 21. FIG. 9B clearly shows the recessed area 17 within the rim 19A.

Figure 9C:
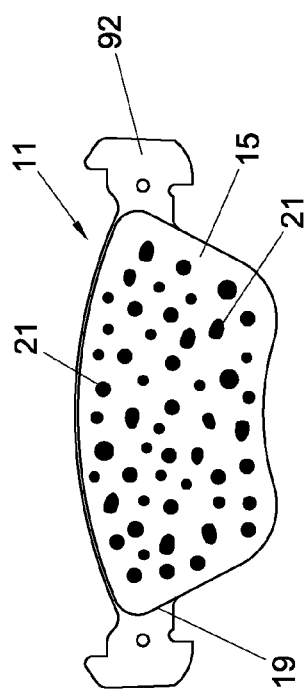
FIG. 9C-D show a brake pad in perspective views.
Figure 9D:
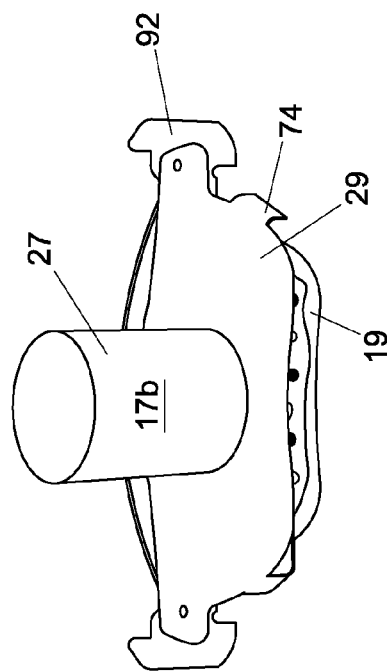

FIG. 9C shows in perspective view the pad 11 with the wall 29 comprising the reservoir 27 which includes the second chamber 17b, mounted over the wall 19 and especially against at least part of the rim 19A. Wings 74 are folded around part of the rim and wall 19, 19A for attaching the wall 29 with the reservoir 27. In FIG. 9D this is also shown in the pad 11, from a different angle. As can be seen the reservoir 27 can have a height H extending from the wall 29, which can be greater than the thickness t of the friction material 15. The brackets 92 can be used for example for guiding the pads 11, for support and for limiting movement of the pad 11.

FIG. 10A-10G show in steps the configuration of a brake assembly 81 of the disclosure, in a combined embodiment of chambers 17a, 17b and collecting device 61. In other embodiment one or more of these can be left out or combined differently.

Figure 10A:
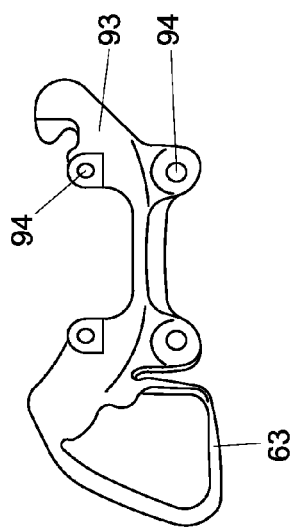
FIG. 10A-G in different steps the assembly of a brake system, from the engine side.

FIG. 10A shows a caliper bracket 93, from one side 84, for example an engine side, showing a body 63 attached to one end thereof. The bracket 93 is substantially C-shaped and is in a known manner formed and provided with mounting openings 94 or such means for mounting the bracket to the further vehicle and/or for mounting the further part or parts of the brake system, especially of the caliper 83. In FIG. 10B the bracket 93 is shown, mounted over part of a brake disc DS. The normal direction of rotation F is shown, indicating that the body or bodies 63 is or are provided down stream from the caliper bracket 93, and, as will be discussed, of the caliper 83. The bracket 93 can be an integral part of the caliper 83 or can be provided separately, as is shown in FIGS. 10 and 11. The body or bodies 63 can also be an integral part of the bracket 93 and/or of the caliper 83.

Figure 10C:
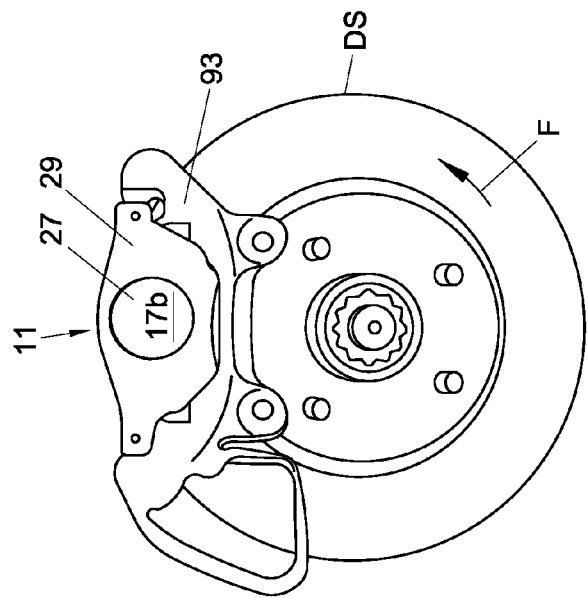
Figure 10B:
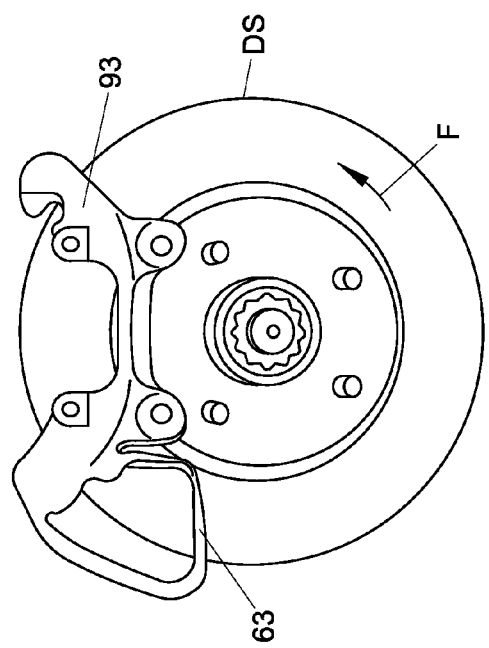
Figure 10D:
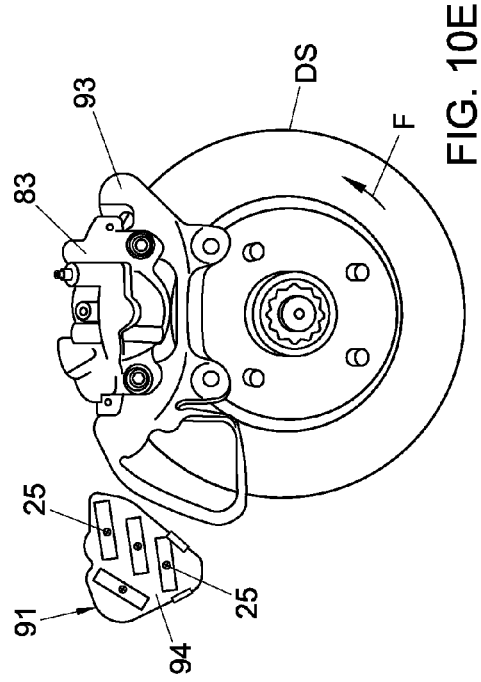

In FIG. 10C a pad 11 is shown in position in and/or on the bracket 93, in which the reservoir 27 and the wall 29 are clearly visible, the reservoir 27 extending substantially away from the disc DS. A magnet or such magnetic field generating device 25 may be comprised in or on the reservoir 27. FIG. 10D shows the caliper 83 mounted on the caliper bracket 93, attached by fasteners in openings 94. The reservoir 27 is substantially contained in the piston 89 of the caliper 83, such that the piston engages the wall 29. Obviously the piston can additionally or instead thereof engage the reservoir 27 for pressing the pad 11 against the disc DS.

Figure 10E:
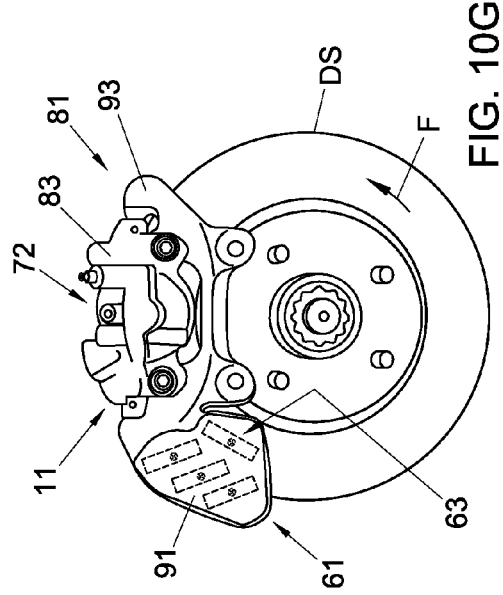
Figure 10F:
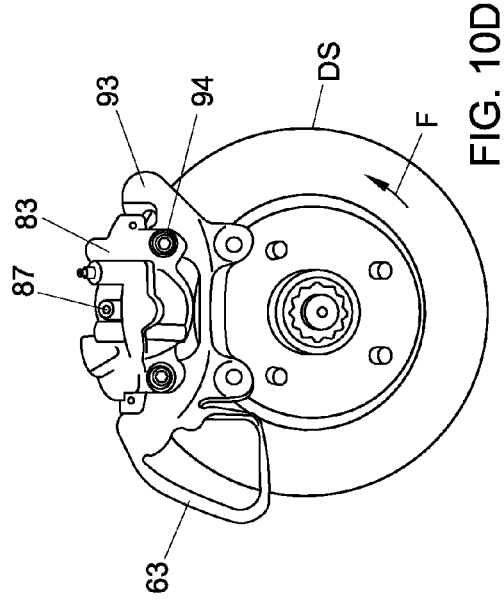

In FIG. 10E a cover 91 is shown, form a side, to be referred to as inner side 94 facing the disc DS when properly mounted to the body 63. In the cover 91a number of magnets or such devices 25 for generating a powder attracting field, such as a magnetic field is provided, at said inner side 94. They could also all or some be provided partly or entirely on the opposite, outer side of the cover or on the member 67. In FIG. 10F the member 67 is shown, held in position at least partly in the body 63, the chamber 67A of the member 67 facing the disc DS. The member 67 can for example be placed by pulling the bodies 63 slightly apart and inserting the member there between from and over the radial side of the disc DS and then releasing the bodies 63 again, which will then enclose or at least retain the member 67.

Figure 10G:
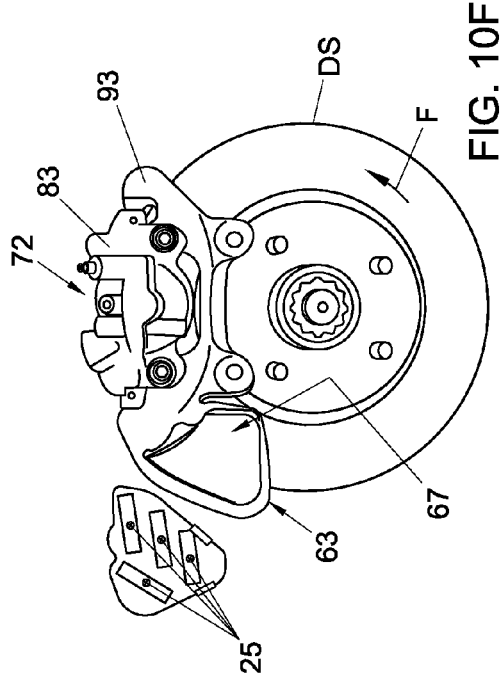

In FIG. 10G the cover 91 is provided over the relevant side of the member 67, thus positioning the devices 25.

Figure 11A:
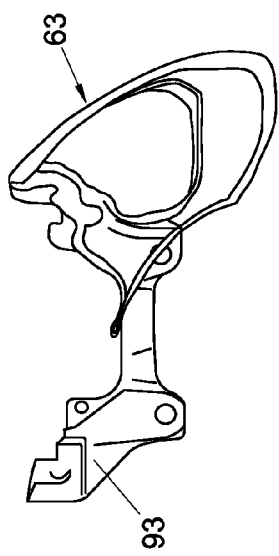
FIG. 11A-G in different steps the assembly of a brake system, from the wheel side.
Figure 11C:
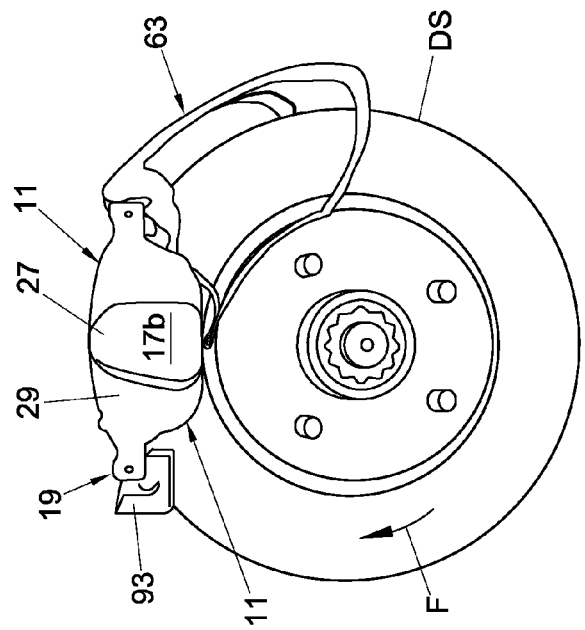
Figure 11B:
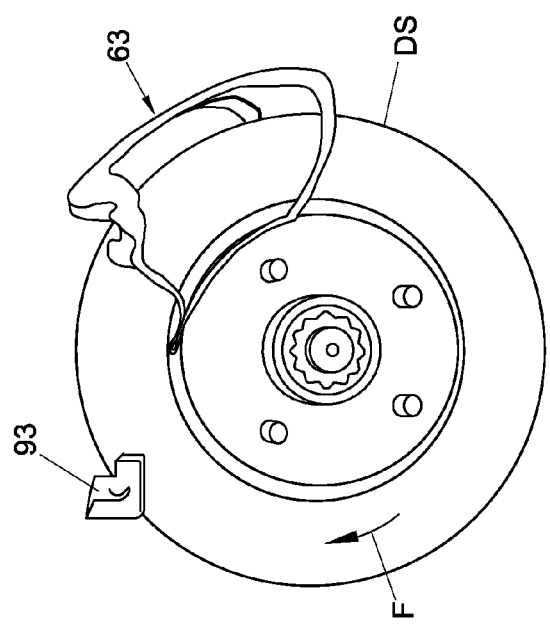
Figure 11D:
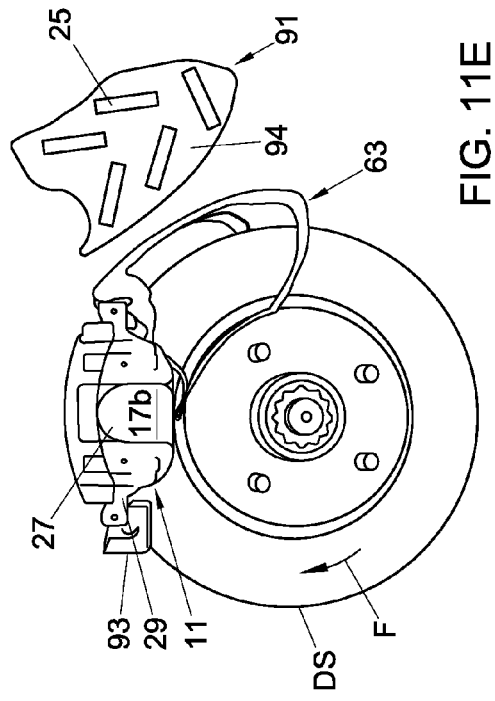
Figure 11E:
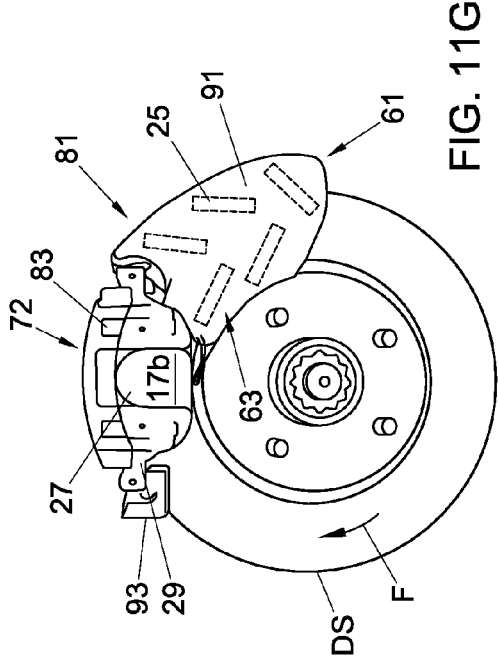

FIG. 11A-G show in steps similar to and partly coinciding with the steps as discussed with respect to FIG. 10A-G, but seen from the opposite side 85, in this embodiment from the wheel side. In FIG. 11A the wheel side of the bracket 93 with the body 63 is shown, shown the two loops of the body 63, connected to the bracket 93. In FIG. 10B the bracket 93 is shown, mounted partly over the disc DS, showing one of the loops of the body 63 at the wheel side of the disc DS. In FIG. 11C the relevant pad 11 is shown, in position. In this embodiment the reservoir 27 of this side can be slightly oblong shaped, to fit within the opening 72 of the caliper 83, as is shown in FIG. 11D.

Figure 11F:
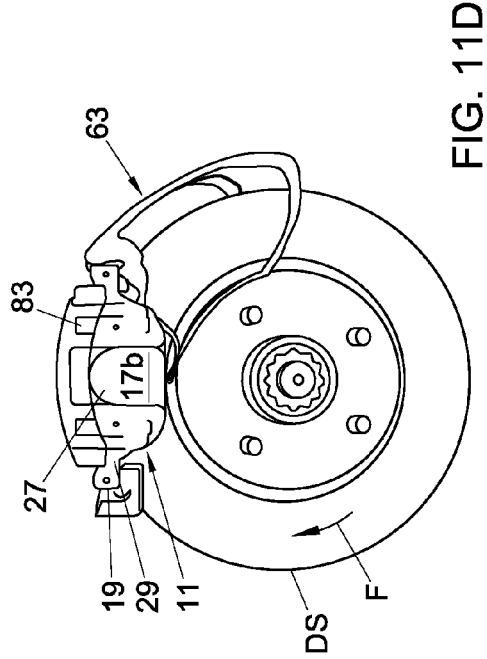
Figure 11G:
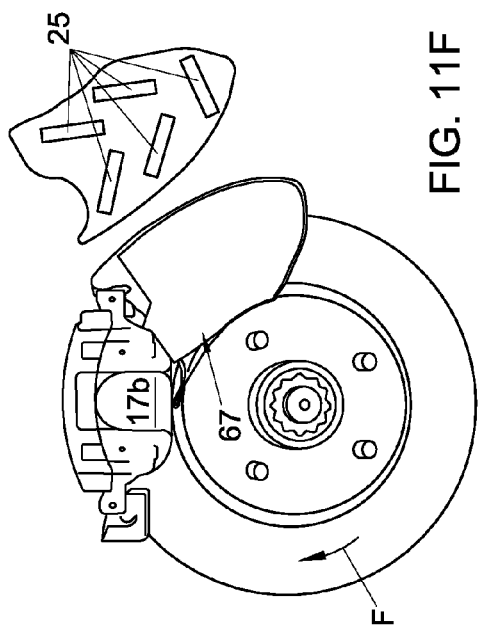

In FIG. 11E again a cover 91 is shown, form a side, to be referred to as inner side 94, facing the disc DS when properly mounted to the body 63. In the cover 91a number of magnets or such devices 25 for generating a powder attracting field, such as a magnetic field is provided, at said inner side 94. They could also all or some be provided partly or entirely on the opposite, outer side of the cover or on the member 67. In FIG. 11F the member 67 is shown, held in position at least partly in the body 63, the chamber 67A of said member 63 facing the disc DS. In FIG. 11G the cover 91 is shown, placed over the relevant part of the member 67.

Tests have been performed with pads 11 and a brake arrangement 81 of the present invention, which have shown that a high percentage of the powder or particles generated by braking with the pads can be collected into the chambers 17, 17a and/or 67a and/or by any device 25 provided in the arrangement 81, in combination. In tests a brake arrangement 81 as shown in FIGS. 9-11 was used, on a regular test bank. Before mounting the arrangement 81 the weight of the friction materials 15 of the individual pads 11 was established, providing a starting weight. Then the disc DS was driven and braked regularly, providing friction and thus wear of the friction material 15 of the pads 11 and of the disc DS. After a desired number of revolutions of the disc and a desired number of brake actions, the arrangement was dismantled and the weight of the remaining friction materials 15 of the pads was established, providing an end weight. Also the weight of the total amount of powder collected inside the chambers 17a, 17b and 67a was established. The difference between the start weight and the end weight of the friction material 15 of the pads was defined as the friction material consumption. The weight of the powder collected was compared with the material consumption, showing that a percentage of more than 90% of the friction material consumption could be collected in this prototype of a brake system 81 according to this disclosure. From comparative tests it has been shown that even more powder could be collected in said chambers 17a and 17b and 67a, including material resulting from wear of the disc DS. This shows that indeed use of a brake assembly 81 and/or brake pads 11 and/or a collecting device 61 according to the present invention can lead to a massive reduction of powder coming from vehicle braking systems and arrangements entering into the environment in an uncontrolled manner.

From tests it has been found that differences in friction and/or friction matter consumption can occur between pads 11 in the same caliper, for example due to difference forces exerted thereon. Without wanting to be bound to any theory, one explanation thereof appears to be the position of the brake piston to one side of the used caliper. In the tests the consumption of friction material of the pad 11 at the side of the brake cylinder-piston was higher than the consumption of friction material 15 of the pad 11 at the opposite side. To accommodate for this difference the pad 11 at the side of the brake cylinder-piston could for example be provided with a set of channels 21, 23, 41 which differ from the set of channels and/or openings of the other pad, for example a larger number of channels and/or openings, bigger channels and/or openings and/or a different position of such channels and/or openings on the side of the brake cylinder-piston than on the opposite side, or vice versa. As indicated before, optimizing can easily be done within the scope of this disclosure based on for example the vehicle type, materials used, brake forces available, pad sizes and dimensions and the like criteria.

Providing removable and/or replaceable liners 70 an/or members 67 as disclosed here above can additionally or separately provide for easy maintenance of a brake arrangement, reduction or elimination of inconvenience or risk for users, and for easy control of effectiveness of such arrangement. Such liners 70 could also be used in other brake arrangements, such as but not limited to arrangement as disclosed in the introduction to the specification. Liners 70 could be magnetically and/or statically charged, for enhancing adherence of powder to the liner.

A brake pad 11 and/or brake arrangement 81 can for example be used as follows, for collecting powders generated by the brake pad of a vehicle brake system. In or at least one chamber (17a, 17b, 67a) associated with a brake pad (11) preferably a magnetic field is generated, in or for said chamber (17a, 17b, 67a), attracting powder resulting from friction on the brake pad (11) Said powder Is retained within said at least one chamber (17a, 17b, 67a). The chamber (17a, 17b, 67a) can be provided with a liner (70) or have a wall material suitable for the powder to adhere to. After a while, for example a relevant number of miles, hours or brake actions, during check ups of the vehicle or at regular or irregular intervals the chambers (17a, 17b, 67a) can be inspected and for example be cleaned out, emptied and/or provided with at least one new liner (70) or member (67) or complete device (61). When the brake pads (11) have outlived their technical life expectancy they may also be changed, in a normal manner.

The present invention is by no means limited to the general and specific disclosures of embodiments as shown and/or described here above by way of example only. Combinations of parts thereof and alternatives thereto are also considered to have been disclosed and to fall within the scope of this disclosure. Further amendments and variations are possible, for example but not limited to embodiments wherein the member 67 and the cover or at least one cover 91 are combined, wherein the device 61 is exchangeable in its entirety for another such device 61, and can for example be disposed, replaced, recycled and/or cleaned in its entirety. Such device can then for example be clipped, screwed or otherwise be attached to the caliper 83 or caliper bracket 93 or otherwise held in position relative to the disc DS. A device 61 could also or alternatively be provided upstream of the caliper 83. Additional means could be provided for sucking and/or otherwise forcing powder into at least one of the chambers, such as but not limited to suction means, for example means for creating a sub atmospheric pressure inside at least one of the chambers (17a, 17b, 67a), preferably at least during rotation of the disc DS relative to the caliper, such as but not limited to a vacuum pump, or by creating an air stream, for example by ventury action, using a liner 70, 67 or such element within the chamber (17a, 17b, 67a) through which the air stream can pass but which acts as a filter for the powder. Means can be provided for providing an indication of the filling of one, more or all of the chambers (17a, 17b, 67a), for example electronic means, indicative for the moment the chambers need to be emptied or at least inspected and/or liners and/or members need to be taken care of, for example replaced, emptied and/or cleaned.

What is claimed:

1. A disk brake pad comprising a supporting base with which a layer of friction material is associated, wherein a wall of said supporting base having associated therewith the layer of friction material is passed through by at least one channel communicating with a chamber, defined in correspondence of the supporting base, for collecting powders produced due to wear of the friction material, and said at least one channel extends through the layer of friction material.

2. A disk brake pad comprising a supporting base with which a layer of friction material is associated, at least one channel extending through the supporting base and communicating with a chamber, defined in correspondence of the supporting base, for collecting powders produced due to wear of the friction material, wherein said at least one channel extends through a portion without friction material of said wall on which the friction material adheres.

3. The brake pad as claimed in claim 1, wherein the layer of friction material, and correspondingly the wall on which said layer adheres, comprise a plurality of said channels.

4. The brake pad as claimed in claim 1, wherein the supporting base includes a collecting reservoir in which a corresponding second collecting chamber is defined.

5. The brake pad as claimed in claim 4, wherein the collecting reservoir is associated with a wall of the supporting base opposed and substantially parallel to said wall.

6. The brake pad as claimed in claim 5, wherein the reservoir is received in correspondence of a threaded bore and has a substantially cylindrical shape with an open first base and a closed opposite base, and it is externally threaded at least in correspondence of its edge surrounding the open base.

7. The brake pad as claimed in claim 1, wherein at least one device capable of generating a magnetic field is arranged inside at least one of the first chamber and the second collecting chamber or for generating a magnetic field in at least one of the first chamber or the second chamber.

8. The brake pad according to claim 1, wherein a liner is provided in at least one of the first chamber or the second chamber separating at least one means for providing a magnetic field provided in or for the relevant chamber from the chamber or part thereof in communication with said at least one channel.

9. The brake pad of claim 8, wherein the liner is replaceable and disposable or recyclable, and is separate from the further brake pad.

10. A disk brake assembly comprising at least one caliper arranged to house at least one brake pad, wherein said brake pad is a brake pad as claimed in claim 1.

11. A brake assembly according to claim 10 having associated therewith a collecting device comprising an arc shaped body intended to receive or provided with a member comprising a chamber, which member is at least partly made of a material capable of retaining the powders, which is provided in at least part of said collecting device.

12. The brake assembly as claimed in claim 11, wherein said member is made of a cellulose-based material.

13. The brake assembly as claimed in claim 11, wherein said collecting device further comprises devices capable of generating a magnetic field.

14. A disk brake pad assembly comprising a supporting base with which a layer of friction material is associated, wherein at least one channel extends through a wall of said supporting base having associated therewith the layer of friction material and communicates with a chamber, defined in correspondence of the supporting base, for collecting the powders produced due to the wear of the friction material, wherein the chamber is formed at a side of the support base opposite the side associated with the friction material.

15. A disk brake pad assembly according to claim 14, wherein a series of channels is provided, opening into said chamber, wherein a collecting reservoir is provided associated with the chamber, in which collecting reservoir a corresponding second collecting chamber is defined.

16. A disk brake pad system according to claim 14, wherein at least one liner is provided in the chamber and/or in a collecting reservoir associated therewith, which liner covers means for generating a magnetic field in said chamber and/or said collecting reservoir.

17. A disk brake pad assembly of claim 16, wherein the at least one liner is removable from the chamber and/or collecting reservoir.

18. A disk brake pad assembly comprising a supporting base with which a layer of friction material is associated, wherein at least one channel extends through at least the layer of friction material and communicates with a chamber for collecting powders produced due to the wear of the friction material, wherein the chamber is provided in a position behind the brake pad.

19. A disk brake pad according to claim 18, wherein said chamber is provided in a member received in a body which can be mounted to a caliper in which the brake pad is to be mounted.

20. Brake assembly comprising a caliper and a brake disc, wherein at least one brake pad is mounted in the caliper for engaging a side of the brake disc, wherein the disk brake pad assembly comprising a supporting base with which a layer of friction material is associated, wherein at least one channel extends through at least the layer of friction material and communicates with a chamber for collecting powders produced due to the wear of the friction material, wherein the chamber is provided in a body extending behind the at least one brake pad, seen in a direction of rotation of the brake disc.

21. Brake assembly according to claim 20, wherein the chamber is provided in a member positioned in or provided on said body.

22. Brake assembly according to claim 20, wherein the body is provided extending over at least a peripheral edge of the brake disc and extending at opposite sides of said brake disc.

23. Brake assembly according to claim 20, wherein the body is provided extending over at least a peripheral edge of the brake disc and extending at opposite sides of said brake disc, wherein the chamber is provided extending also over at least a peripheral edge of the brake disc and extending at opposite sides of said brake disc.

24. Brake assembly according to claim 20, wherein at least at least one liner is provided in the chamber and/or in a collecting reservoir associated therewith, which liner covers means for generating a magnetic field in said chamber and/or said collecting reservoir.

25. Brake assembly according to claim 20, wherein means for generating a magnetic field are provided in or for said chamber.

26. Brake assembly according to claim 20, wherein a liner is provided in the at least one chamber and/or reservoir, which liner is replaceable for another liner.

* * * * *